July 17, 1956 R. THEILE 2,755,408

TELEVISION PICK-UP APPARATUS

Filed Oct. 6, 1951 3 Sheets-Sheet 1

Inventor
Richard Theile
By O'Brien & Blair
Attorneys

Inventor
Richard Theile
By O'Brien & Blair
Attorneys

Inventor
Richard Theile
By [signature]
Attorneys

United States Patent Office 2,755,408

Patented July 17, 1956

2,755,408

TELEVISION PICK-UP APPARATUS

Richard Theile, Cambridge, England, assignor to Pye Limited, Cambridge, England, a British company Application October 6, 1951, Serial No. 250,047

Claims priority, application Great Britain October 6, 1950

20 Claims. (Cl. 315—11)

This invention relates to television apparatus for generating video signals, which comprises a television pickup tube.

The present invention provides television apparatus comprising a television pickup tube containing a photocathode adapted to emit photo-electrons under the influence of a light image projected thereon, a double-sided target in the tube of plate-like perforate structure comprising an insulator or semi-conductor on one side and a conductor forming an electrode on its opposite side, means for focussing photo-electrons released from the photo-cathode as an electron image upon the insulating or semi-conducting side of the target to develop and store on that side a pattern of local potentials in response to the electron image, means for scanning the opposite side of the target with a beam of low velocity electrons, means whereby a biassing potential can be applied to said target electrode to bias the target with respect to the source of the scanning beam so that either the target tends to return electrons of the scanning beam impinging thereon towards their source but can allow electrons from the beam to pass through the interstices of the target under the influence of and in accordance with local potentials acquired by the potential storage side (i. e. the insulating or semi-conducting side) of the target in response to the electron image, or the target tends to allow the beam electrons arriving at its interstices to pass therethrough but can prevent such passage of electrons from the beam under the influence of and in accordance with local potentials acquired by the storage side of the target, an electrode in the tube for collecting beam electrons which pass through the target, means whereby beam electrons which pass through the interstices of the target are prevented from returning to the target, and means whereby the potential pattern acquired by the storage side of the target can be changed after each scan.

The present invention also provides a television pickup tube comprising an evacuated envelope containing a double-sided perforate target plate comprising an insulator or semi-conductor on one side and a conductor forming an electrode on the opposite side, a photo-cathode arranged at the insulating or semi-conducting side of the target and spaced therefrom, means arranged at the conducting side of the target for generating a beam of electrons for scanning the conducting side of the target, and a collector electrode arranged at the insulating or semi-conducting side of the target for collecting electrons passing from said beam through the interstices of the target, the arrangement of said collector electrode permitting photo-electrons emitted from the photo-cathode to impinge upon the insulating or semi-conducting side of the target.

The target electrode, photo-cathode, beam-generating means and collector electrode of the tube are furnished with leads sealed through the envelope wall for applying to them their operating potentials. For operating the tube, means are provided for accelerating and focussing upon the insulating or semi-conducting side of the target photo-electrons released from the photo-cathode, and for causing the scanning beam of electrons to scan the target and to approach it at low velocity and substantially normal incidence. Such means may comprise electrostatic or electromagnetic devices, or both electrostatic and electromagnetic devices, and may be arranged within or outside the tube envelope, according to the nature of the devices employed.

In one preferred form, the target consists of a fine wire mesh having its wires covered on one side of the mesh with a coating of insulating or semi-conducting material, which may be deposited on the mesh wire by evaporation, for example.

For a clearer understanding of the invention, some embodiments thereof are shown diagrammatically by way of example, in the accompanying drawings, in which.

In the several figures of the drawings, like parts are denoted by the same reference numerals.

Figures 1, 2, 3, 4, 11:
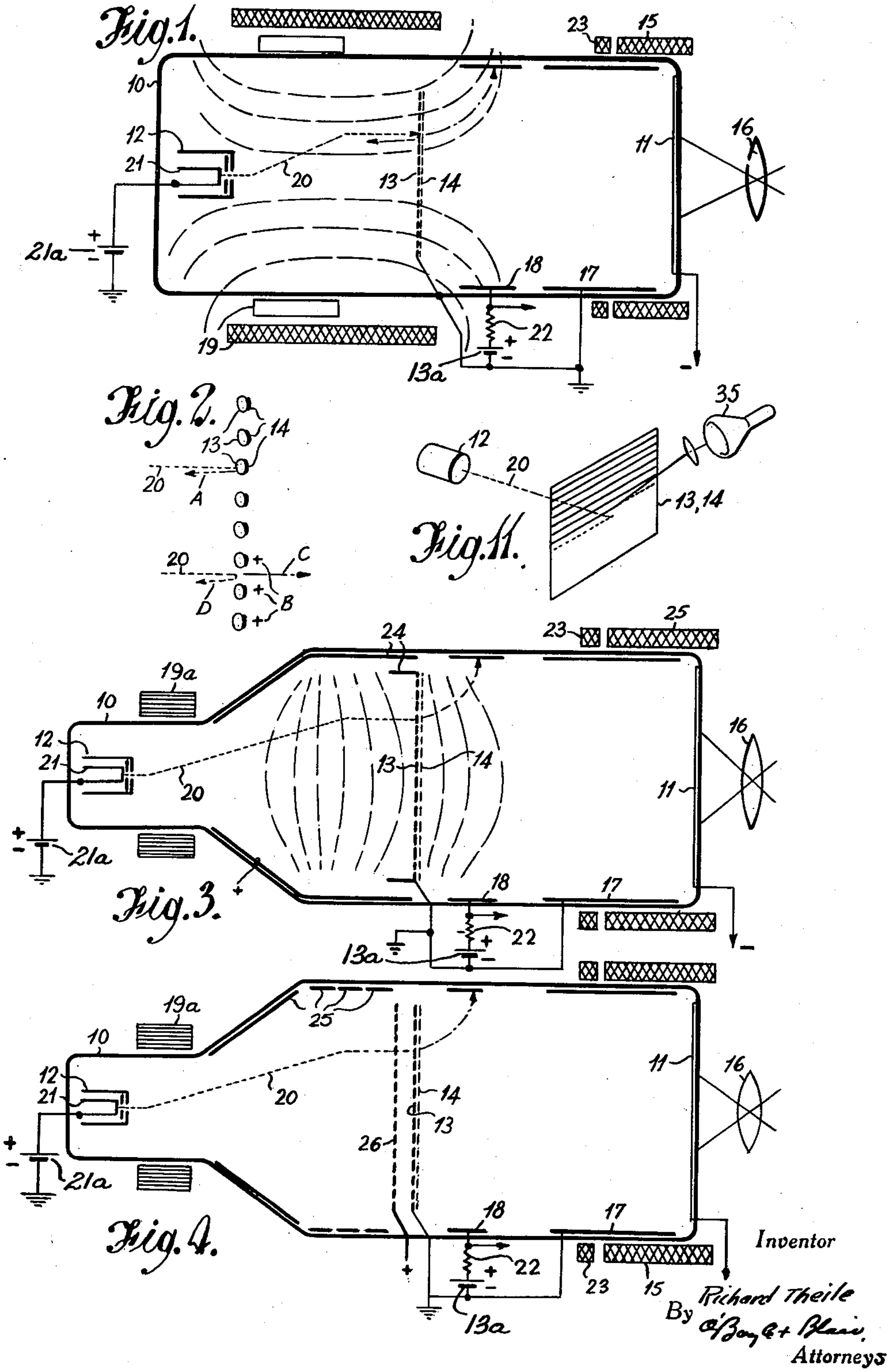
Fig. 1 depicts one embodiment.
Fig. 2 is an explanatory diagram.
Fig. 3 depicts another embodiment.
Fig. 4 depicts a modification of Fig. 3.
Figs. 8 to 11 illustrate arrangements for erasing the potential pattern after scanning.

In the embodiment of Fig. 1, a cylindrical evacuated tube envelope 10 has a flat end wall on which a continuous photo-cathode 11 is formed. At the other end of the tube is mounted an electron gun 12, and intermediately is mounted a target plate 13, 14 parallel to the photo-cathode and spaced apart from it and from the gun. The target consists of a fine wire mesh electrode 13, the wires of which are coated on the side of the mesh facing the photo-cathode with a thin layer 14 of insulating material. At the photo-cathode end, the envelope is surrounded by an image focussing coil 15 constituting a magnetic lens for focussing photo-electrons released from the photo-cathode under the influence of a light image focussed thereon by an optical lens system 16, into an electron image on the coating 14. An electrode 17, shown as an internal wall coating on the envelope, serves to accelerate the photo-electrons towards the target. For the purpose of illustration, it is assumed in this embodiment that the photo-electrons are accelerated to impinge on the coating 14 at high velocity such as to cause the bombarded elements of the coating to emit secondary electrons in the ratio to incident photo-electrons of greater than unity, thus charging the bombarded elements positively. It may be assumed, for example, that the mesh 13 and accelerating electrode 17 are held at ground potential and the photo-cathode 11 at a negative potential of, say 1,000 volts. In the vicinity of the mesh 13 at its coated side is a collector electrode 18, shown as an internal wall coating on the envelope, and this electrode is held at a high positive potential relatively to the mesh. That part of the envelope between the gun 12 and the target is provided with means, including external focussing and deflecting coil assemblies 19, of a conventional type for orthogonal scanning, such as are used in an image orthicon, these means being adapted to deflect and control the beam 20 generated by the gun so that the beam electrons arrive at the target substantially normal thereto and at substantially zero velocity.

The mesh 13 is biassed with respect to the cathode 21 of the gun, so that under dark conditions, i. e. in the absence of photo-electrons bombarding the coating 14, the mesh repels all the beam electrons which accordingly return to the gun, as illustrated at A in Fig. 2. In the drawings, the mesh is schematically shown negatively biassed with respect to cathode 21 by the interposition of battery 21*a* with its positive pole connected to cathode 21 and its negative pole to earth, and of battery 13*a* whose negative pole is connected to mesh 13 and earth so that the mesh 13 is negative to earth and cathode 21 positive to earth. Under exposure of the photo-cathode 11 to a light image, the same condition applies where elementary areas of the coating 14 are not being bombarded by photo-electrons, such elements corresponding to dark elements of the light image. However, where elements of the coating 14 are being bombarded, they emit secondary electrons, which are collected by the collector 18, and acquire positive potentials, as illustrated at B in Fig. 2, of magnitude depending upon the number of photo-electrons striking the elements which is, in turn, dependent upon the brightness of the corresponding elements of the light image. These potentials make the target effectively positive at the interstices of the mesh 13 in the vicinity of the charged elements of the coating 14, so that when the scanning beam arrives at these interstices some of its electrons pass through them, as illustrated at C in Fig. 2, in number dependent upon the local effective potential, and these electrons are guided to the collector 18 while the remainder of the beam electrons are returned to the gun, as illustrated at D in Fig. 2. The current obtained from the collector 18 thus includes a fluctuating component due to the electrons which have been allowed to pass through the mesh, which component is representative of the distribution of light in the light image and accordingly may be utilised to develop video signal voltages across a suitable load 22 in the collector lead.

Although it has been assumed in this embodiment that high velocity photo-electron bombardment of the coating 14 is utilised to charge its elements positively, the alternative mode of operation earlier described may be utilised instead, in which the mesh 13 is biassed with respect to the cathode 21 so as to allow the beam electrons which arrive at its interstices to pass therethrough, in the absence of photo-electron bombardment, and the photo-electron bombardment of the coating 14 is effected at low velocity to charge the coating elements negatively so that the charged elements prevent beam electrons from passing through the mesh interstices in the vicinity of the elements, in accordance with the potentials of the elements.

Precaution is taken that the magnetic field of the beam focussing assembly is ended in the vicinity of the target, as illustrated, so that in the space between the target and the collector there is present only the fringing field of the focussing assembly, which serves to guide the electrons from the target on to the collector. There is also an electrostatic field between the mesh 13 and collector 18, due to their difference of potential, and this field also assists in guiding the electrons to the collector. Precaution is taken also to avoid interference of the field of the image focussing coil 15 with the guiding fields in the control space between the target and the collector. The space between the target and the photo-cathode 11 is made sufficiently large to minimise such interference, but a compensating coil 23 may additionally be provided to neutralise the end field of the image focussing coil 15 and thereby minimise interference.

In Fig. 1 magnetic means are depicted for focussing the photo-electrons and for focussing and deflecting the scanning beam. However, electrostatic means may be employed for either or both of these purposes. For example, Fig. 3 shows a modification in which electrostatic means are employed for scanning the target with the low velocity beam electrons, the electrostatic means being there depicted as an electrostatic immersion lens 24, which includes in it the target mesh 13 and the focal point of which substantially coincides with the deflection centre. Instead of an immersion lens, an arrangement as shown in Fig. 4 may be employed, comprising a series of electrodes 25 between the gun 12 and the target mesh 13, which are held at progressively increasing potentials and adapted to submit the electrons in the beam to accelerating electrostatic fields for collimating the beam so that it can be decelerated without excessive loss of definition so as to arrive at the mesh 13 with substantially zero velocity, by means of a decelerating mesh electrode 26 between the electrodes 25 and the mesh 13 and held at a positive potential with respect to the target mesh 13.

In Figs. 3 and 4, coils 19*a* are shown for deflecting the beam 20 magnetically but, of course, electrostatic deflecting means may be used instead. Also, an electrostatic lens may be substituted for the image focus coil 15. The field for guiding the electrons on to the collector 18 is provided by the electrostatic field between the collector and the mesh 13.

Figures 5, 6:
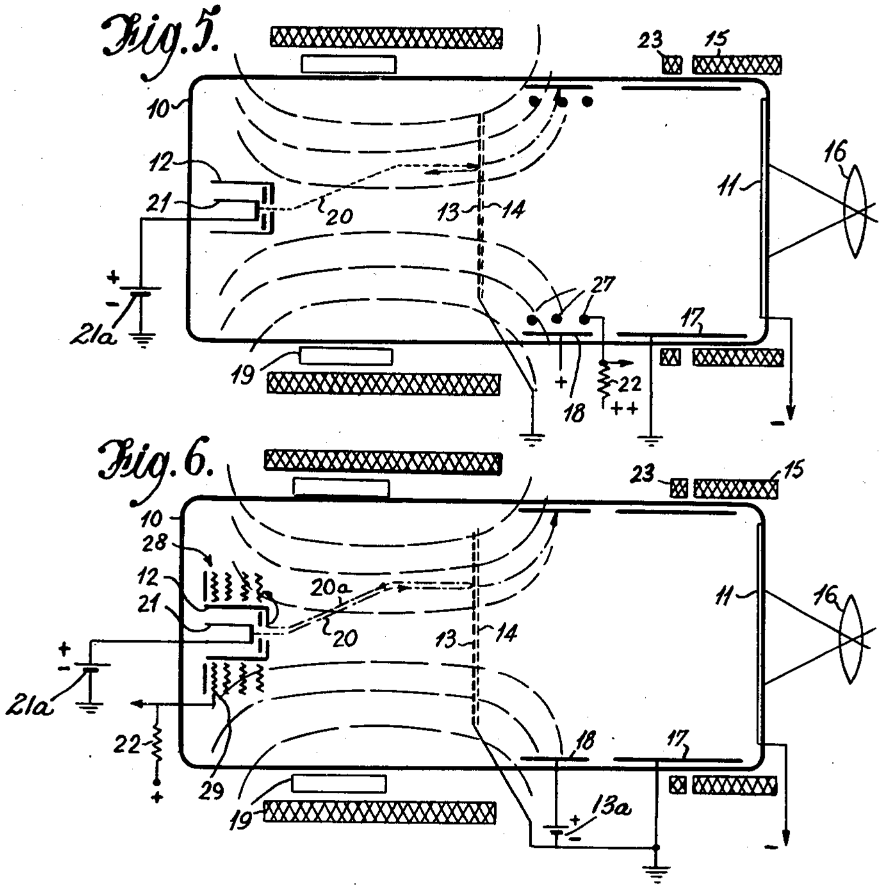
Figs. 5 and 6 illustrate arrangements for incorporating an electron multiplier.

In Figs. 1, 3 and 4 the signal output is illustrated as being taken from the collector 18. However, an electron multiplier may be incorporated in the tube in each case to increase the signal output. Fig. 5 depicts one example, applied to the tube of Fig. 1. Instead of taking the output signal direct off the collector 18, as in Fig. 1, the collector 18 in Fig. 5 is activated to make it highly secondary emissive, and an openwork anode 27 is provided in front of the collector so that electrons from the target reach the collector through the interstices of the anode 27 and cause the emission of secondary electrons which are collected by the anode 27, from which the signal output of the tube is taken off across the load 22 in the anode lead. It will be apparent that a similar arrangement may be applied to the tubes of Figs. 3 and 4. The collector 10 and anode 27 form a single-stage electron multiplier, but of course, a multiplier having any desired number of stages of electron multiplication may be provided instead.

Fig. 6 shows an alternative arrangement in which, instead of taking the signal from the collector 18, with or without electron multiplication, as exemplified in Figs. 1 and 5, the signal is developed from the return electron beam current 20*a*, the electrons of which are multiplied by an electron multiplier 28 of as many stages as desired, which is arranged around the gun 12, the output signal being taken off from the final anode 29 of the multiplier 28, across the load 22 in series with the anode 29. For the purpose of illustration, Fig. 6 depicts the described electron multiplier arrangement applied to the tube of Fig. 1, but it will be evident that a similar arrangement may be applied to the tubes of Figs. 3 and 4.

Figure 7:
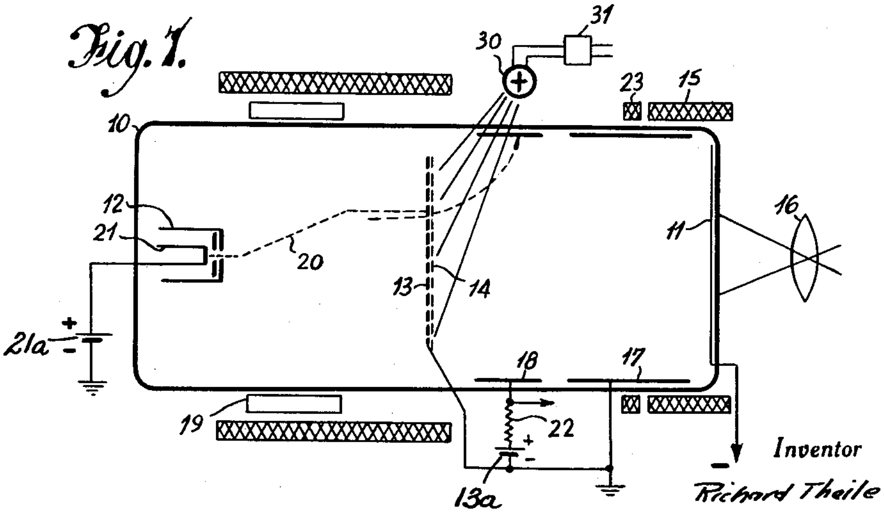
Fig. 7 illustrates an arrangement providing a target having a controlled time constant.

In all the embodiments described, the target coating 14 may consist of a semi-conducting material having a suitable time constant, as earlier described, for changing the potential pattern between successive scans. Of the arrangements already described for providing a target of adjustable time constant, Fig. 7 depicts one example applied, for the purpose of illustration, to the tube of Fig. 1. In this example, the adjustment of time constant is effected by means of light irradiation, and accordingly the target coating 14 consists of a photo-conductive material having a very high dark resistance and a time constant at dark resistance which is higher than the optimum value desired. A suitable light source 30 is arranged to irradiate the coating 14 continuously so as to reduce its resistance and time constant, and a suitable device 31 is arranged for adjusting and setting the intensity of irradiation and thus the time constant of the coating to any desired value. The light employed, whether visible or invisible, is preferably of a spectral composition to which the coating 14 is responsive but the photo-cathode 11 is substantially insensitive. For example, with a photo-cathode responsive to visible light, the coating 14 may be irradiated with infra-red. With infra-red irradiation, owing to its heating effect, the coating may consist of any semi-conducting material since the resistance of any such material changes under the influence of heat.

Figures 8, 9, 10:
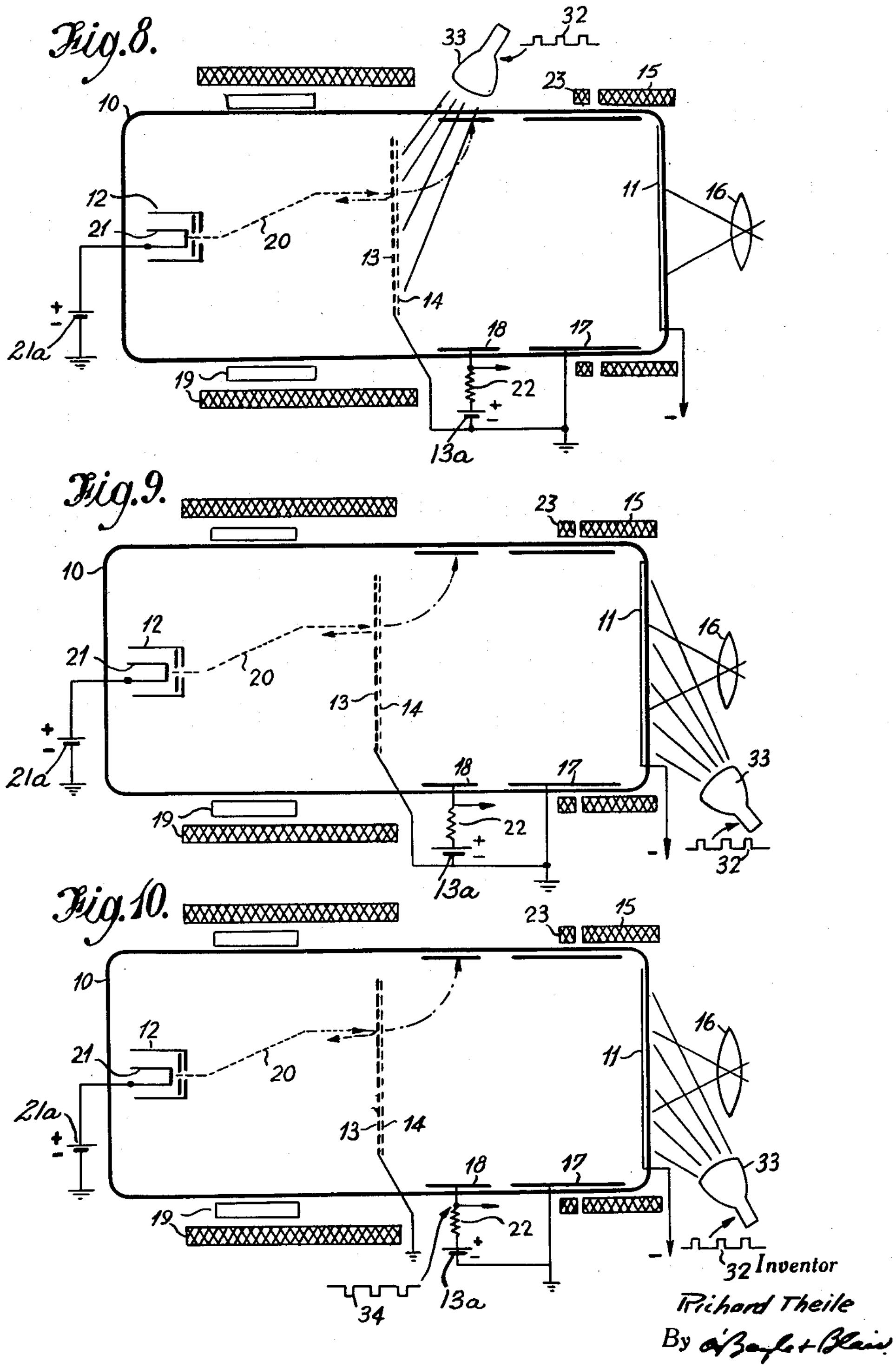

Instead of providing a coating 14 having a time constant such as to cause the potential pattern to change between scans by continuous charge leakage through the coating, means may be provided, as illustrated in Figs. 8 to 11, for erasing the pattern. Figs. 8 to 10 show erasing arrangements applied to the tube of Fig. 1, for the purpose of illustration, but similar arrangements may obviously be applied to the tubes of Figs. 3 and 4. Fig. 8 shows one arrangement using a photo-conductive coating 14 of very high dark resistance. A suitable source 33 of light (visible or invisible) to which the coating is responsive is arranged to irradiate the coating intermittently with a light pulse during each frame blanking period, so as to reduce the resistance of the coating sufficiently to cause elimination of the stored potential pattern. In the figure 32 may be regarded as graphically representing either the light pulses emitted by the source 33, or controlling voltage or current pulses applied to the source 33 to produce the light pulses. The source 33 may, for example, be a cathode ray tube with means for producing a light raster on its screen of any convenient type. Such means are well-known in the art and need not be described or illustrated here. The pulsing is preferably arranged to be operative only during a portion of the frame blanking period, as and for the purpose earlier mentioned.

Fig. 9 shows another arrangement in which the light source 33, instead of directly irradiating the target coating 14 with the light pulses, is arranged similarly to irradiate the photo-cathode 11, thus causing it to emit a pulse of diffuse photo-electrons which bombard the coating 14 (which need not in this case be photo-conductive) and so eliminate the potential pattern. Fig. 10 shows a similar arrangement to Fig. 9, but with the addition of negative voltage pulses 34 applied to the collector 18 simultaneously with the application of the light pulses, in order to return to the coating 14 any electrons emitted therefrom under the photoelectron bombardment.

Fig. 11 illustrates a further arrangement for erasing the potential pattern by employing a photo-conductive coating 14 and scanning it with a light spot obtained from the raster of an external cathode ray tube 35 and following, with a short time delay, the electron beam 20 scanning the other side of the target. In this figure, the trace of the scanning beam on the target is indicated in broken lines and the following trace of the light spot is indicated in full lines.

In the drawings, the mesh 13 is shown as being biassed slightly negatively with respect to the gun cathode 21, but this is not necessarily so, as the mesh bias is, in general, substantially zero, that is to say, it may be zero or slightly negative or slightly positive according to other operating conditions. Therefore, in this respect the drawings are merely illustrative.

I claim:

1. Television apparatus comprising a television pick-up tube containing a photo-cathode adapted to emit photo-electrons under the influence of a light image projected thereon, a double-sided target in the tube of mesh structure comprising an insulator or semi-conductor on one side and a conductor forming an electrode on its opposite side, means for focussing photo-electrons released from the photo-cathode as an electron image upon the insulating or semi-conducting side of the target to develop and store on that side a pattern of local potentials in response to the electron image, means for scanning the opposite side of the target with a beam of low velocity electrons, means for applying a biassing potential to said target to bias it with respect to the source of the scanning beam, and such as to allow beam electrons to pass through said target in number proportional to the strength of the electron image formed on said target, an electrode in the tube for collecting said beam electrons which have passed through the target, means for preventing beam electrons which pass through the interstices of the target from returning to the target, and means other than the scanning beam for changing the potential pattern acquired by the storage side of the target after each scan.

2. Apparatus as claimed in claim 1, comprising further means for so biassing said target with respect to the cathode source of the scanning beam that in the absence of photo-electrons striking the storage side of the target each elementary area of the target when scanned returns all incident beam electrons towards the beam source.

3. Apparatus as claimed in claim 1, comprising further means for so biassing said target with respect to the cathode source of the scanning beam that in the absence of photo-electrons striking the storage side of the target, all beam electrons arriving at the interstices of the target can pass therethrough.

4. Apparatus as claimed in claim 1, in which, for changing the potential pattern of the target after each scan, the storage side of the target is made from a semi-conducting material, the resistance, and hence the time constant, of which changes under the influence of suitable energy applied to the material and in which a suitable source for supplying such energy to the material is provided, together with means for adjusting the intensity of the applied energy so as thereby to adjust the resistance and hence the time constant of the material.

5. Apparatus as claimed in claim 4, in which the storage surface of the target consists of a semi-conducting material, and means are provided for heating the material so as thereby to reduce its resistance and time constant, means also being provided for adjusting the intensity of heating so as thereby to adjust the resistance and hence the time constant of the material.

6. Apparatus as claimed in claim 5, in which the heating is effected by irradiation of the material with radiant heat energy.

7. Apparatus as claimed in claim 1, in which, for changing the potential pattern of the target after each scan, the storage side of the target is made of a photo-conductive material having a very high dark resistance and in which a light source is arranged for illuminating the material with light to which it is photo-sensitive, suitable means also being provided for adjusting the intensity of the illumination so as thereby to adjust the resistance and hence the time constant of the material.

8. Apparatus as claimed in claim 7, in which the light for the illumination has a spectral composition to which the photo-cathode is substantially insensitive in order to avoid interference with the photo-cathode by light reflected on to it from the target.

9. Apparatus as claimed in claim 1, in which the means for changing the potential pattern of the target after each scan comprises means for erasing point by point the acquired potentials after scanning by a scanning process operating on the storage side of the target with a suitable phase delay while the scanning electron beam is scanning the opposite side of the target.

10. Apparatus as claimed in claim 9, in which for the purpose of erasing the pattern the storage side of the target consists of a photo-conductive material which has a very high dark resistance.

11. Apparatus as claimed in claim 1, in which, the means for changing the potential pattern of the target after each scan comprises means for erasing the acquired potentials operating to erase the whole potential pattern during the frame blanking period, preferably during only an initial portion of that period in order to allow time within that period for a fresh pattern to develop before scanning by the electron beam recommences.

12. Apparatus as claimed in claim 11, in which for the purpose of erasing the pattern the storage side of the target consists of a photo-conductive material which has a very high dark resistance.

13. Apparatus as claimed in claim 12, in which a scanning light spot is caused to scan the photo-conductive side of the target with a short time delay following the scanning electron beam scanning the opposite side of the target so that shortly after the beam is scanned any elementary area on the conducting side of the target, the light spot scans the corresponding element on the storage side of the target and erases the potential thereat.

14. A television pick-up tube comprising an evacuated envelope containing a double-sided mesh target comprising an insulator or semi-conductor at one side and a conductor forming an electrode on the opposite side, a photo-cathode located at one end of the tube to face the insulating or semi-conducting side of the target and spaced therefrom, means located at the other end of said tube and facing the conducting side of the target for generating a beam of electrons for scanning the conducting side of the target, means for applying a biassing potential to said target to bias it with respect to the source of the scanning beam and such as to allow beam electrons to pass through said target in number proportional to the strength of the electron image formed on said target, a collector electrode located between said target and said photo-cathode at the insulating or semi-conducting side of the target for collecting electrons passing from said beam through the interstices of the target, the arrangement of said collector electrode permitting photo-electrons emitted from the photo-cathode to impinge upon the insulating or semi-conducting side of the target, and means other than the scanning beam for changing the potential pattern acquired by the said side of the target that comprises an insulator or semi-conductor after each scan.

15. A tube as claimed in claim 14, in which electromagnetic devices are provided for accelerating and focussing upon the insulating or semi-conducting side of the target photo-electrons released from the photo-cathode and for causing the scanning beam of electrons to scan the target and to approach it at low velocity and substantially normal incidence.

16. A tube as claimed in claim 14, in which both electrostatic and electromagnetic devices are provided for accelerating and focussing upon the insulating or semi-conducting side of the target photo-electrons released from the photo-cathode and for causing the scanning beam of electrons to scan the target and to approach it at low velocity and substantially normal incidence.

17. A tube as claimed in claim 14, in which the target consists of a fine wire mesh having its wires covered on one side of the mesh with a coating of insulating or semi-conducting material.

18. Apparatus as claimed in claim 14, in which the storage side of the target consists of a coating of any semi-conducting material that has the property of having a suitable time constant which will allow the charges acquired by elementary areas of the storage surface to leak away through the material to the target electrode at a suitable rate to obtain the required change of potential pattern.

19. Television apparatus comprising a television pick-up tube containing a photo-cathode adapted to emit photo-electrons under the influence of a light image projected thereon, a double-sided target in the tube of mesh structure, comprising an insulator or semi-conductor on one side and a conductor forming an electrode on its opposite side, means for focussing photo-electrons released from the photo-cathode as an electron image upon the insulating or semi-conducting side of the target to develop and store on that side a pattern of local potentials in response to the electron image, means for scanning the opposite side of the target with a beam of low velocity electrons, means for applying a biassing potential to said target to bias it with respect to the source of the scanning beam and such as to allow beam electrons to pass through said target in number proportional to the strength of the electron image formed on said target, an electrode in the tube and forming part of an electron-multiplier for collecting said beam electrons which have passed through the target, means for preventing beam electrons which pass through the interstices of the target from returning to the target, and means for charging the potential pattern acquired by the storage side of the target after each scan.

20. A television pick-up tube comprising an evacuated envelope containing a double-sided mesh target comprising an insulator or semi-conductor at one side and a conductor forming an electrode on the opposite side, a photo-cathode located at one end of the tube to face the insulating or semi-conducting side of the target and spaced therefrom, means located at the other end of said tube and facing the conducting side of the target for generating a beam of electrons for scanning the conducting side of the target, means for applying a biassing potential to said target to bias it with respect to the source of the scanning beam and such as to allow beam electrons to pass through said target in number proportional to the strength of the electron-image formed on said target, a collector electrode located between said target and said photo-cathode at the insulating or semi-conducting side of the target and forming part of an electron multiplier for collecting electrons passing from said beam through the interstices of the target, the arrangement of said collector electrode permitting photo-electrons emitted from the photo-cathode to impinge upon the insulating or semi-conducting side of the target, and means for changing the potential pattern of the said side of the target that comprises an insulator or semi-conductor, after each scan.

References Cited in the file of this patent

UNITED STATES PATENTS

| | | |
|---|---|---|
| 2,322,807 | Iams | June 29, 1943 |
| 2,458,205 | Rose | Jan. 4, 1949 |
| 2,495,042 | Wilder et al. | Jan. 17, 1950 |
| 2,550,316 | Wilder | Apr. 24, 1951 |
| 2,699,511 | Sheldon | Jan. 11, 1955 |